US006245421B1

(12) United States Patent
Aurenty et al.

(10) Patent No.: US 6,245,421 B1
(45) Date of Patent: Jun. 12, 2001

(54) PRINTABLE MEDIA FOR LITHOGRAPHIC PRINTING HAVING A POROUS, HYDROPHILIC LAYER AND A METHOD FOR THE PRODUCTION THEREOF

(75) Inventors: Patrice M. Aurenty, Wood-Ridge; Ajay Shah, Livingston, both of NJ (US); Ken-Ichi Shimazu, Briarcliff Manor, NY (US)

(73) Assignee: Kodak Polychrome Graphics LLC, Norwalk, CT (US)

( * ) Notice: Subject to any disclaimer, the term of this patent is extended or adjusted under 35 U.S.C. 154(b) by 0 days.

(21) Appl. No.: 09/244,041

(22) Filed: Feb. 4, 1999

(51) Int. Cl.$^7$ ................................ B32B 5/00; B05D 5/04

(52) U.S. Cl. ........................ 428/304.4; 427/152; 428/195; 428/209; 428/211; 428/331

(58) Field of Search ............................ 427/152; 428/195, 428/207, 304.4, 423.1, 474.4, 476.3, 476.6, 500, 209, 211, 331, 341, 342

(56) References Cited

U.S. PATENT DOCUMENTS

| | | | |
|---|---|---|---|
| 3,877,372 | 4/1975 | Leeds | 101/465 |
| 4,278,467 | 7/1981 | Fadner | 106/2 |
| 4,781,985 | 11/1988 | Desjarlais | 428/421 |
| 4,833,486 | 5/1989 | Zerillo | 346/1.1 |
| 4,854,969 | 8/1989 | Bassemir et al. | 106/2 |
| 5,364,702 | 11/1994 | Idei et al. | 428/423.1 |
| 5,551,585 | 9/1996 | Huang et al. | 216/11 |
| 5,716,436 | 2/1998 | Sorriero et al. | 106/31.87 |
| 5,820,932 | 10/1998 | Hallman et al. | 427/261 |
| 5,900,345 | 5/1999 | Platzer et al. | 430/156 |

FOREIGN PATENT DOCUMENTS

| | | |
|---|---|---|
| 2107980 | 4/1994 | (CA) . |
| 0 101 266 | 2/1984 | (EP) . |
| 071345 | 6/1985 | (EP) . |
| 0 503 621 | 9/1992 | (EP) . |
| 0 503 621 A1 | 9/1992 | (EP) . |
| 0 738 608 | 10/1996 | (EP) . |
| 0 738 608 A2 | 10/1996 | (EP) . |
| 751194 | 1/1997 | (EP) . |
| 0 847 868 A1 | 6/1998 | (EP) . |
| 847868 | 6/1998 | (EP) . |
| 0 882 584 | 12/1998 | (EP) . |
| 9-255765 | 9/1997 | (JP) . |
| 902 9926A1 | 12/1997 | (JP) . |
| 10 151852A | 6/1998 | (JP) . |
| 63 224988A | 9/1998 | (JP) . |

OTHER PUBLICATIONS

Patent Abstracts of Japan, vol. 1998, No. 11(Sep. 30, 1998) and JP 10–151852 (Jun. 9, 1998).

Patent Abstracts of Japan, vol. 13, No. 14 (M–784) (Jan. 13, 1989) and JP 63–224988 (Sep. 20, 1998).

3M Fluorad Fluorosurfactants For Coating Formulations and Household Product Additives (1996).

Du Pont Zonyl Fluorosurfactants Product Information Bulletin (undated).

*Primary Examiner*—Bruce H. Hess
(74) *Attorney, Agent, or Firm*—James C. Lydon

(57) ABSTRACT

A printable media, including: (a) a substrate having a hydrophilic, porous layer on at least one surface; and (b) an ink receptive, thermoplastic image layer adhered to the hydrophilic, porous layer, where the ink receptive layer contains a copolymer having a low surface energy and a plurality of tertiary amine sites, the amine sites being at least partially neutralized with an acid. The invention also relates to a method for preparing a printable media, including: (a) applying a hydrophilic porous layer onto a substrate; (b) applying a fluid composition onto the hydrophilic porous layer by means of an ink jet printing apparatus, where the fluid composition contains a copolymer having a plurality of tertiary amine sites, the amine sites being at least partially neutralized with an acid, and (c) drying the composition.

47 Claims, 1 Drawing Sheet

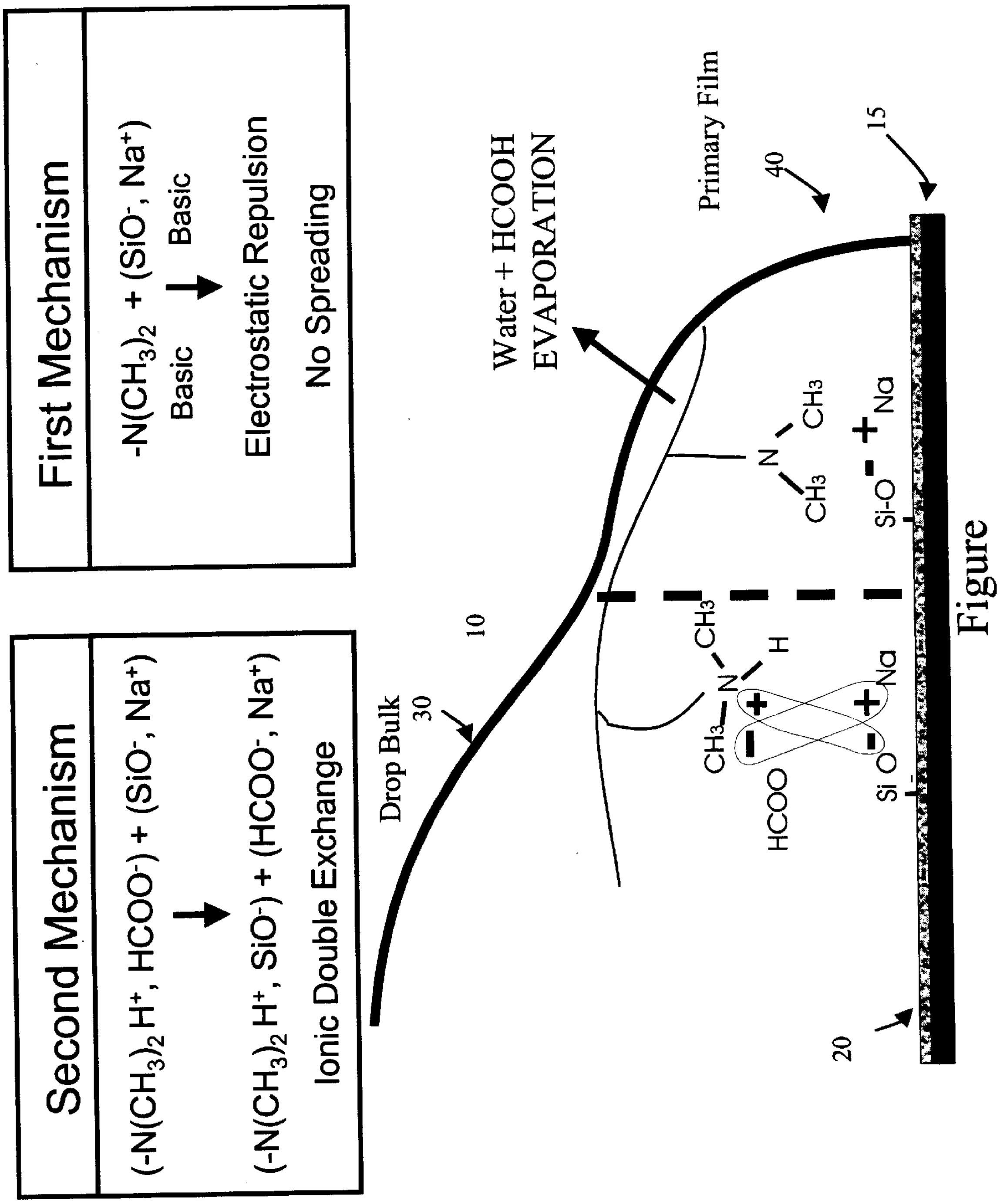
Figure

PRINTABLE MEDIA FOR LITHOGRAPHIC PRINTING HAVING A POROUS, HYDROPHILIC LAYER AND A METHOD FOR THE PRODUCTION THEREOF

FIELD OF THE INVENTION

The present invention relates to a printable media, such as a lithographic printing member, and an ink jet printing process for production thereof. The printable media of the present invention, when used as a lithographic printing member, exhibit good resolution, and do not suffer from the "fingerprint" problem associated with conventional lithographic plates. They are also suitable for pressruns of over 100,000 copies.

BACKGROUND OF THE INVENTION

The offset lithographic printing process utilizes a developed planographic printing plate having oleophilic image areas and hydrophilic non-image areas. The plate is commonly dampened before or during inking with an oil-based ink composition. The damping process utilizes an aqueous fountain solution such as those described in U.S. Pat. Nos. 3,877,372, 4,278,467 and 4,854,969. When water is applied to the plate, the water will form a film on the hydrophilic areas (i.e. the non-image areas of the plate) but will contract into tiny droplets on the oleophilic plate areas (i.e. the image areas). When a roller carrying an oil-based ink composition is passed over the dampened plate, it will be unable to ink the areas covered by the aqueous film (the non-image areas), but will emulsify the water droplets on the water repellant areas (the image areas) which will then take up ink. The resulting ink image is transferred ("offset") onto a rubber blanket, which is then used to print a substrate such as paper.

Conventional lithographic plates can easily be damaged by "fingerprint" that occurs during the pressman's handling of the plate during set-up. More particularly, oils such as squalene and other oleophilic substances are transferred from the pressman's hands to the printing plate surface, thereby affecting the carefully delineated hydrophilic and hydrophobic areas of the plate. This causes the first several images printed by the plate to be defective. The printable media of the present invention do not suffer from this "fingerprint" problem.

Lithographic printing plates can be manufactured using a mask approach and a dye-based hot melt ink jet ink. For example, U.S. Pat. No. 4,833,486 discloses a dye-based hot melt ink composition which is jetted onto a conventional photopolymer plate. The deposited ink acts as a mask during plate exposure, and is removed from the plate together with the exposed photopolymer during development of the plate. This technique involves multiple processing steps such as UV-irradiation, chemical development and plate drying, which result in high production costs and environmental concerns.

It has been proposed to apply "direct" ink jet printing techniques to lithographic printing. For example, European Patent Publication No. 503,621 discloses a direct lithographic plate making method which includes jetting a photocuring ink onto the plate substrate, and exposing the plate to UV radiation to harden the image area. An oil-based ink may then be adhered to the image area for printing onto a printing medium. However, there is no disclosure of the resolution of ink drops jetted onto the substrate, or the durability of the lithographic printing plate with respect to printing runlength.

Canadian Patent No. 2,107,980 discloses an aqueous ink composition which includes a first polymer containing a cyclic anhydride or derivative thereof and a second polymer that contains hydroxyl sites. The two polymers are thermally crosslinked in a baking step after imaging of a substrate. The resulting matrix is said to be resistant to an acidic fountain solution of an offset printing process. The Examples illustrate production of imaged plates said to be capable of lithographic runlengths of from 35,000 to 65,000 copies, while a non-crosslinked imaged plate exhibited a runlength of only 4,000 copies.

Both of these direct lithographic proposals require a curing step, and the Canadian patent illustrates the importance of this curing step to extended runlengths. The present invention eliminates the need for such a thermal or irradiation steps while providing a direct lithographic plate capable of a runlength of at least 100,000 copies.

It is known to improve the resolution of ink jet printers by applying an ink receiving layer to substrates such as metal, plastic, rubber, fabrics, leather, glass and ceramics, prior to printing thereon. See, for example, European Patent Publication No. 738,608 which discloses a thermally curable ink receiving layer containing a first water soluble high molecular weight compound having a cationic site in the main polymer chain and a second water soluble high molecular compound having a side chain containing a condensable functional site. Alternatively, the second high molecular weight compound may be replaced with a monomer or oligomer having at least two (meth)acryloyl sites, which results in a UV radiation curable ink receiving layer. In either case, the cationic site of the first polymer is said to permit an ink solvent to readily penetrate the ink receiving layer. The ink receiving layer of the present invention does not require either a thermal or irradiation curing step.

Porous ink receptive layers are also known. European Patent Publication No. 738 608, discussed above, suggests the inclusion of pore-bearing fine particles of an organic or inorganic material in order to attain quick absorption capacity in terms of absorption speed and absorption volume for an ink-receiving layer. Pigments such as silica and clay are suggested as the inorganic particles. Other references which disclose clay-containing substrates, as opposed to clay-containing layers supported on a substrate, include U.S. Pat. Nos. 4,833,486 and 5,364,702.

U.S. Pat. No. 4,833,486 discloses an ink jet image transfer lithographic apparatus which jets melted hydrophobic ink onto aluminum or paper plates, with paper plates having a high clay content found to be useful and economical. No discussion of specific clays or porosity of the plate is provided.

U.S. Pat. No. 5,364,702 discloses an ink-jet recording layer supported on a substrate, with the ink receiving layer containing at least one of acetylene glycol, ethylene oxide addition product and acetylene glycol and acetylene alcohol, each of which have a triple bond in its molecule. The ink receiving layer may also contain an inorganic pigment such as silica, a water-soluble polymeric binder, and a cationic oligomer or polymer. No discussion of porosity is provided. The printable media of the present invention employs a copolymer having a plurality of amine sites, which are at least partially neutralized with an acid.

U.S. Pat. No. 5,820,932 discloses a process for the production of lithographic printing plates. Ink jet liquid droplets form an image upon the surface of a printing plate corresponding to digital information depicting the image as provided by a computer system which is in communication with the printer heads. The droplets from the printer head comprise resin forming reactants which polymerize on the plate surface, alone or in combination with reactant precoated on the plate, to form a printable hard resin image. The resin image so formed provides a lithographic printing plate useful for extended print runs. In contrast, the present invention does not require polymerization of the fluid composition jetted upon the printable media substrate.

SUMMARY OF THE INVENTION

An object of the present invention is to provide a lithographic printing plate capable of extended runlengths which exhibits good resolution and transfer to the substrate.

Another object of the present invention is to overcome the "fingerprint" problem.

A feature of the present invention is a substrate having a porous ceramic (clay-containing) layer supported thereon.

Another feature of the invention is an ink-receptive, thermoplastic layer supported on the porous layer, with the ink receptive layer containing a copolymer having a low surface energy and a plurality of tertiary amine sites, the amine sites being partially neutralized with an acid.

An advantage of the present invention is the elimination of the exposure and chemical development steps of conventional lithographic printing plate manufacturing processes, thereby achieving lower production cost and an environmentally-friendly process.

In one aspect, the present invention relates to a printable media, including: (a) a substrate having a hydrophilic, porous layer on at least one surface; and (b) an ink receptive, thermoplastic image layer adhered to the hydrophilic porous layer, wherein the ink receptive layer contains a copolymer having a low surface energy and a plurality of tertiary amine sites, the amine sites being at least partially neutralized with an acid.

The invention also relates to a method for preparing a printable media, including: (a) applying a hydrophilic, porous layer onto a substrate; (b) applying a fluid composition onto the hydrophilic, porous layer by means of an ink jet printing apparatus, where the fluid composition contains a copolymer having a plurality of tertiary amine sites, the amine sites being at least partially neutralized with an acid, and (c) drying the fluid composition.

BRIEF DESCRIPTION OF THE DRAWING

The FIGURE illustrates the theoretical mechanisms believed responsible for the improved properties exhibited by the printable media of the present invention. More specifically, the FIGURE illustrates the acid/base matching of a fluid composition to the silicated, hydrophilic, porous layer.

DETAILED DESCRIPTION OF THE PREFERRED EMBODIMENTS

The applicants have discovered a high resolution printable media that can be imaged by drop-on-demand ink jet printing techniques without using conventional exposure and development steps. The printable media can be employed as a lithographic printing plate, and does not suffer from the "fingerprint" problem which afflicts conventional lithographic plates. The resolution of the printable media can be even further improved by acid/base interfacial matching of a basic, porous and hydrophilic substrate with a fluid composition which contains a partially or completely neutralized basic polymer.

By "hydrophilic" it is meant a surface on which the equilibrium contact angle of water is less than 40 degrees when measured in an air environment at 25° C. and at 35% relative humidity using a goniometer. As a reference point, the equilibrium contact angle of water on a surface deemed to be substantially hydrophilic is from 0 to 20 degrees.

By "porous layer" it is meant a hydrophilic layer having a water or water-based ink absorption rate which results in an acoustic attenuation of at least 5% of the original acoustic signal after 5 seconds, as determined by acoustic measurements using an EST surface sizing instrument commercially available from Muetek Analytic, Inc., Marietta, Ga.

By "fluid composition" it is meant a composition that, when applied by an ink jet print head onto a hydrophilic, porous layer of a substrate, will form an image area which, when dried, will adhere to the layer and will accept subsequent application of ink conventionally used in lithographic printing. The fluid composition thus must satisfy the demanding performance requirements of ink jet ink compositions.

As summarized above, the printable media of the present invention includes:

(a) a substrate having a hydrophilic, porous layer on at least one surface; and (b) an ink receptive, thermoplastic image layer adhered to the hydrophilic, porous layer, where the ink receptive layer (i.e., image area) contains a copolymer having a low surface energy and a plurality of tertiary amine sites, the amine sites being at least partially neutralized with an acid.

The substrate may be aluminum, polymeric film or paper, and is preferably roughened by conventional chemical, electrochemical or mechanical surface treatments. A chemical roughening treatment is disclosed in U.S. Pat. No. 5,551,585, the disclosure of which is incorporated by reference herein in its entirety. It is known that the surface of an aluminum substrate may be made basic by contacting the aluminum with an aqueous silicate solution at a temperature between 20° C. and 100° C., preferably between 80 and 95° C.

Polymeric substrates such as polyethylene terephthalate or polyethylene naphthalate film can be coated with a hydrophilic subbing layer composed of, for example, a dispersion of titanium dioxide particles in crosslinked gelatin to provide a roughened surface. Paper supports can be similarly treated and employed as substrates.

The hydrophilic, porous layer of the substrate includes a water soluble binder, hardening agent and a clay selected from the group consisting of kaolin, hydrotalcite, glauconite, a mixture of metal oxides, a serpentine clay, a montmorillonite clay, an illite clay, a chlorite clay, a vermiculite clay, a bauxite clay, an attapulgite clay, a sepiolite clay, a palygorskite clay, a corrensite clay, an allophane clay, an imogolite clay, a boehmite clay, a gibsite clay, a cliachite clay and a laponite clay. Kaolin and montmorillonite clays are preferred, and a clay containing a mixture of aluminum oxide, silicon oxide, sodium, titanium, calcium, aluminum and silica is especially preferred.

The water soluble binder may be selected from the group consisting of gelatin, a cellulose, poly(vinyl pyrrolidone), polyacrylamide, polyvinyl alcohol, agar, algin, carrageenan, fucoidan, laminaran, gum arabic, corn hull gum, gum ghatti, guar gum, karaya gum, locust bean gum, pectin, dextrin, starch and polypeptide. A cellulosic binder, such as hydroxypropyl methyl cellulose, is preferred.

Suitable hardening agents include, but are not limited to, tetraalkoxysilanes (such as tetraethoxysilane and tetramethoxysilane) and silanes having at least two hydroxy, alkoxy or acetoxy groups, including but not limited to 3-aminopropyltrihydroxysilane, glycidoxypropyltriethoxysilane, 3-aminopropylmethyldihydroxysilane, 3-(2-aminoethyl) aminopropyltrihydroxy silane, N-trihydroxysilylpropyl-N, N,N-trimethylammoniumchloride, trihydroxysilylpropanesulfonic acid and salts thereof. The first two compounds in this list are preferred. These materials can be readily obtained from several commercial sources including Aldrich Chemical Company, Milwaukee, Wis.

The hydrophilic, porous layer may also contain amorphous silica particles (for example, about 5 $\mu$m in average size) to provide a surface roughness that is eventually used for printing, fillers (such as ground limestone, talc, calcium sulfate, barium sulfate, titanium dioxide, zinc oxide, zinc sulfide, zinc carbonate, titanium white, aluminum silicate, diatomaceous earth, calcium silicate, magnesium silicate, aluminum hydroxide, alumina and lithophone), pigments (such as styrene-based plastic pigments, acrylic-based plastic pigments, microcapsules and urea resin pigments), pigment dispersants, thickeners, blowing agents, penetrants, dyes or colored pigments, optical brighteners, ultraviolet radiation absorbers, antioxidants, preservatives and antifungal agents.

The hydrophilic, porous layer may also contain a nonionic surfactant, such as CT-121 which contains 2,4,7,9-tetramethyl-5-decyne-4,7-diol, (available from Air Products Corporation, Allentown, Pa.), ZONYL™ FSN nonionic surfactant (available from DuPont, Wilmington, Del.), Olin 10G (available from Olin Corporation, Stamford, Conn.) and FLUORAD™ FC 431 nonionic surfactant (available from 3M Company, St. Paul, Minn.). CT-121 is preferred.

The hydrophilic, porous layer may also contain one or more metal oxides of silicon, beryllium, magnesium, aluminum, germanium, arsenic, indium, tin, antimony, tellurium, lead, bismuth or transition metals. For purposes of this application, silicon is considered a "metal." Silicon oxide, aluminum oxide, titanium oxide and zirconium oxide compounds are preferred, and silicon oxide and titanium oxide compounds are most preferred, in the practice of this invention. Mixtures of oxides can also be used in any combination and proportions.

Suggested amounts of the components of the hydrophilic, porous layer are shown below. These amounts are for dry coating weight percentages, and all ranges are considered approximate including their end points (that is "about").

TABLE 1

| Component | Broad Range | Preferred Range |
|---|---|---|
| Clay | 30–80% | 50–70% |
| Colloidal silica | 15–50% | 20–40% |
| Water-soluble polymer binder | 2–15% | 5–12% |
| Hardening agent | 1–10% | 1–5% |
| Surfactant | 0.01–1% | 0.1–0.5% |
| Amorphous silica | 0.1–10% | 1–3% |

The porous, hydrophilic composition may be applied to the substrate as an aqueous solution or dispersion by conventional methods, and then permitted to harden (crosslink) by drying the composition at elevated temperatures, for example 100–120° C. for 5–10 minutes. The hydrophilic, porous layer so obtained has a dry coating weight of at least 5 g/m$^2$, preferably from 10 to 20 g/m$^2$.

The fluid composition is applied over the areas of the hydrophilic, porous layer which constitute a desired image, preferably by means of an ink jet printing apparatus. The fluid composition is then dried to form an ink receptive, thermoplastic image layer adherent to the hydrophilic, porous layer.

Drying may be accomplished by allowing the fluid composition to air dry or, preferably by the application of heat, for example, by exposure to temperatures of 105 to 130° C. for 5–60 seconds. Forced air drying can be used to reduce drying time. In this regard, the hydrophilic layer is sufficiently porous that it permits a portion of the water of the fluid composition to be absorbed into the interior of the layer rather than remaining on the surface. This porosity is believed to permit fast drying of each dot of the fluid composition in place, and to minimize expansion of the dot over the surface of the hydrophilic layer.

When the printable media is prepared by ink jet application of the fluid composition onto the hydrophilic, porous layer of the substrate, the resulting ink receptive layer comprises a plurality of dots forming a desired image to be printed. By proper selection of a suitable porous hydrophilic layer, the dots can have an average ratio (i.e., dot diameter:droplet diameter) of not more list than 2.5, preferably not more than 2.2, where droplet diameter is defined as the size of a droplet of a fluid composition formed by the ink jet printer employed to apply the ink receptive layer. The lower the average ratio, the higher the resolution.

The fluid composition typically also contains a surfactant, a humectant and water in addition to the copolymer, which may be selected from the group consisting of polyacrylates, styrenated polyacrylates, polyamides and polyurethanes. Suitable polyacrylates and styrenated polyacrylates may be prepared from comonomers having the following formula:

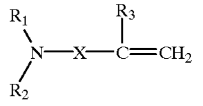

where $R_1$ is hydrogen or $C_{1-5}$ alkyl;

$R_2$ is $C_{1-5}$ alkyl;

$R_3$ is hydrogen or methyl;

X is $—C_6H_4—$ or

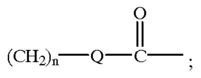

n is 2 to 6; and

Q is oxygen or N—H.

Illustrative comonomers include acrylates such as dimethylaminoethyl acrylate, dimethylaminoethyl methacrylate, diethylaminoethyl acrylate, diethylaminoethyl methacrylate, di(t-butyl)aminoethyl acrylate and di(t-butyl)aminoethyl methacrylate, acrylamides such as dimethylamino-propyl methacrylamide, and styrenes such as p-dimethylamino styrene, and diethylamino styrene.

The copolymer may also be a polyamide prepared from a comonomer having at least one tertiary amine site in its backbone. Suitable comonomers include 1,4-bis(3-aminopropyl) piperazine and dialkyl $C_{1-10}$ 1,4-piperazinedipropionate.

The copolymer may also be a polyurethane prepared from a comonomer having the following formula:

$$HOH_2CH_2C—Z—CH_2CH_2OH$$

where Z is an aliphatic, cycloaliphatic or aromatic divalent radical which contains at least one tertiary amino group, with the proviso that the radical is bonded to the remainder of the comonomer structure by carbon-to-carbon bonds. Suitable comonomers which may be employed to prepare the copolymer include those which conform to the following formula:

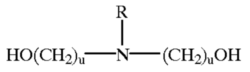

wherein

R is an aliphatic, cycloaliphatic or aromatic substituent, and u is 1 to 6. N-methyldiethanol amine is a suitable comonomer.

Comonomers which conform to the following formula may also be employed to prepare the copolymer:

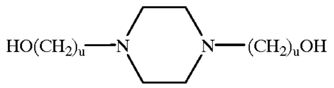

wherein u is 1 to 6.

An acid is employed to partially or completely neutralize the amine sites of the copolymer, and should possess a relatively low molecular weight. Suitable acids conform to one of the formulae in the group consisting of H—$(CH_2)_n$—COOH and

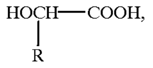

where

R is hydrogen, —$CH_3$ or —$CH_2CH_3$; and n is a number from 0 to 6.

Formic acid, acetic acid, lactic acid, and glycolic acid are preferred as the neutralizing acid, with formic acid being especially preferred.

The copolymer should have a maximum surface energy, as measured according to the Owens-Wendt method, as described in J. APPL. POL. SCI, 13, p. 1741 (1969), based on two liquid probes (water and diiodomethane), of 50 dynes/cm, preferably from 20 to 50 dynes/cm.

The second component of the fluid composition is a non-ionic or cationic surfactant which serves to lower the dynamic surface tension of the fluid composition so that it can be jetted upon a substrate by a conventional ink jet printer. The dynamic surface tension of the fluid composition may range from 20 to 60 dynes/cm, preferably from 32 to 44 dynes/cm. Acetylenic glycols, ethoxylated glycols, ethoxylated/propoxylated block copolymers and sorbitan esters are preferred surfactants.

The viscosity of the fluid composition should not exceed 20 centipoise at 25° C., and is preferably 1 to 10 centipoise, most preferably 1 to 5 centipoise.

The fluid composition preferably contains a humectant to ensure that it will retain water while the ink jet printer is idle. Suitable humectants include glycerol, ethylene glycol, diethylene glycol, triethylene glycol, propylene glycol, dipropylene glycol, tripropylene glycol, ethylene glycol monomethyl ether, diethylene glycol monomethyl ether, triethylene glycol monomethyl ether, and propylene glycol monomethyl ether, di-propylene glycol monomethyl ether, tripropylene glycol monomethyl ether, and combinations thereof.

The fluid composition may be prepared by mixing the appropriate amounts of copolymer and the non-ionic or cationic surfactant in deionized water. Thus, the fluid composition may preferably contain from 0.1 to 10 percent by weight of the copolymer, from 0.001 to 5 weight percent by weight of the surfactant, and from about 85 to about 99 percent by weight water, all based upon the total weight of the composition. It is even more preferred that the fluid composition contain from 0.1 to 3 weight percent by weight of the copolymer, from 0.05 to 1 weight percent of the surfactant, and from 95 to 99 weight percent water, based on the total weight of the composition. The humectant may be present in an amount of from 0.1 to 10 weight percent, preferably 1 to 3 weight percent, based on the total weight of the composition.

The fluid composition may also contain colorants, biocides, corrosion inhibitors and anti-foaming agents.

While not intending to be bound by theory, the applicants currently believe that the surface of the hydrophilic, porous layer is basic. In an especially preferred embodiment, the hydrophilic, porous layer has a plurality of sodium silicate sites, which renders its surface even more basic. The fluid composition contains a basic copolymer which is partially or fully neutralized with an acid. It is thus possible to "interfacially match" the basic, hydrophilic and porous layer of the printing plate substrate with the basic copolymer of the fluid composition. It is preferred that the basic sites of the fluid composition's copolymer should be partially neutralized, thereby ensuring that both acidic and basic sites are present in the copolymer. The presence of both acidic and basic sites is believed to permit two different mechanisms (electrostatic repulsion and double salt replacement) to occur simultaneously. This "acid/base interfacial matching" theory is illustrated by the FIGURE and explained below.

Without intending to be bound by theory, it is generally accepted that a liquid droplet applied to a relatively solid surface will spread as a very thin primary film in advance of the bulk of the liquid droplet. This is illustrated in the FIGURE, where droplet 10 of a fluid composition has been deposited upon a substrate 15 having a basic, hydrophilic, porous layer 20. The bulk 30 of the droplet is surrounded by a primary film 40. The applicants currently believe that water and the relatively volatile acid evaporates relatively quickly from the very thin primary film of a droplet of the fluid composition deposited on the silicated, hydrophilic and porous layer of the printing plate substrate. The net effect of such evaporation is to increase the relative percentage of non-neutralized basic sites of the copolymer which are present in the primary film in comparison to the bulk of the liquid droplet. These non-neutralized basic sites will be repulsed by the basic sites present on the surface of the silicated porous layer. The electron pair repulsion between the free tertiary amine groups of the polymer and the basic sites of the silicated porous layer tends to reduce the expansion the liquid droplet, which results in a dot diameter which is smaller in relation to the diameter of the liquid droplet, thereby imparting superior resolution to the ink receptive composition. In this first mechanism, the silicated porous layer and the partially neutralized basic copolymer of the fluid composition are "interfacially matched" to provide for such repulsion.

A second mechanism, as also shown in the FIGURE, is believed to occur in the bulk of the liquid droplet. Relatively little evaporation of the acid and water occurs in the bulk of the liquid droplet. Thus, the proportion of acid neutralized basic sites in the bulk of the droplet is greater than in the primary film. It is theorized that an acid/base double salt substitution reaction occurs between the acid sites present in the partially neutralized basic copolymer in the bulk of the ink droplet and the basic sites present on the surface of the silicated porous layer. In this second mechanism, the silicated porous layer and the partially neutralized basic copolymer of the fluid composition are "interfacially matched" to provide a proton from the neutralized amine group which is attracted by the basic site of the sodium silicate, as shown in the FIGURE. This second mechanism is currently believed to be responsible for the superior adhesion and durability of the resulting ink receptive layer, and may explain why a crosslinking step is not required in the present invention. Thus, the ink receptive layer is "thermoplastic" in the sense that it is not covalently crosslinked.

The following examples illustrate preferred embodiments of the invention, and are not intended to limit the scope of the invention in any manner whatsoever.

EXAMPLE 1

Preparation of a Partially Neutralized Basic Copolymer

A mixture of methyl isobutyl ketone ("MIBK", 300 g), n-dodecylmercaptan (0.75 g) and VAZO 88 1,1'-azobicyclohexanecarbonitrile initiator (15 g) was stirred, nitrogen-blanketed and heated to reflux temperature. Then a blend of dimethylaminoethyl methacrylate (84 g), methyl methacrylate (216 g) and MIBK (20 g) was added dropwise over 2.5 hours at as constant a rate as possible. A solution of VAZO 88 initiator (1.5 g) in MIBK (20 g) was added thirty minutes later. Heating and stirring were discontinued about 4 hours later, resulting in a clear, golden solution. The solution was concentrated by removing about 166.2 g MIBK by distillation. At about 80° C., water (559 g) was added and azeotropic distillation began, and a pasty mass resulted. When the temperature of the pasty mass reached 90° C., water (55 g) and formic acid (19 g) were added, resulting in a much more fluid dispersion. Azeotropic distillation of this dispersion was continued until its temperature reached 99° C. and very little MIBK was being removed.

The product was an opaque dispersion of a 28% DMAEMA/72% MMA copolymer 75% neutralized with formic acid. The dispersion had a pH of 6.20, a percent solids of 33.2, and a Brookfield viscosity of 16900 centipoise at 5 rpm.

EXAMPLE 2

Preparation of a Partially Neutralized Basic Copolymer

A two-liter, four-necked glass reactor was charged with methyl isobutyl ketone ("MIBK", 240 g) and the stirred, nitrogen-blanketed solvent heated to reflux temperature. Meanwhile, separate addition funnels were charged with a) a blend of methyl methacrylate (140 g), ethyl acrylate (40 g), and 2-(dimethylamino)ethyl methacrylate (70 g), and b) a solution of "VAZO 88" 1,1'-azobicyclohexanecarbonitrile initiator (1.0 g) in MIBK (25 g). Simultaneous dropwise addition was started at reflux and carried out at rates such that each addition was completed in 2.5 hours. The monomer funnel was rinsed into the batch with MIBK (20 g). An hour later VAZO 88 initiator (1 g) in MIBK (10 g) was added, followed by a 5 g MIBK funnel rinse. Heating was stopped three hours later, and stirring was discontinued after the reaction mixture cooled to room temperature.

After at least eight hours, a solids determination showed virtually complete conversion. The solution was concentrated by distillation, removing 85 g of solvent. The solution was diluted with a solution of formic acid (15.4 g) (approximately 75% of theoretical neutralization) and water (400 g). The resulting viscous, heterogeneous dispersion was azotropically distilled until its temperature reached 99° and little or no more MIBK was being removed. During this distillation, water (150 g) was added to reduce viscosity. As the dispersion cooled, it was diluted further with water (100 g), plus ten drops of formic acid.

The product was a translucent dispersion of a 56% methyl methacrylate/28% dimethylaminoethyl methacrylate/16% ethyl acrylate copolymer 75% neutralized with formic acid. The dispersion had a pH of 6.25, a percent solids of 26.2 and a Brookfield viscosity of 4100 centipoise at 20 rpm.

EXAMPLE 3

Formulation of Fluid Compositions

Fluid compositions were prepared by adding an appropriate amount of the partially neutralized, basic copolymer dispersions of Examples 1 and 2 to deionized water which additionally contained a non-ionic surfactant and a glycerol humectant. The mixture was stirred to ensure homogeneous mixing, and filtered through a 1 micron pore size filter. The resulting fluid compositions are set forth below in Table 2 below:

TABLE 2

| Formulation | Cationic Polymer | Non-ionic Surfactant | Deionized Water | Humectant |
|---|---|---|---|---|
| III-1 | 3% Ex. 1 | 0.1% SURFYNOL 465[1] | 94.9% | 2% glycerol |
| III-2 | 2.9% Ex. 2 | 0.3% SURFYNOL 465 | 94.8% | 2% glycerol |
| III-3 | 2.7% Ex. 1 | 0.30% SURFYNOL 465 | 94.0% | 3% glycerol |

[1]Non-ionic surfactant conforming to the following formula and commercially available from Air Products Co. under the SURFYNOL 465 trademark:

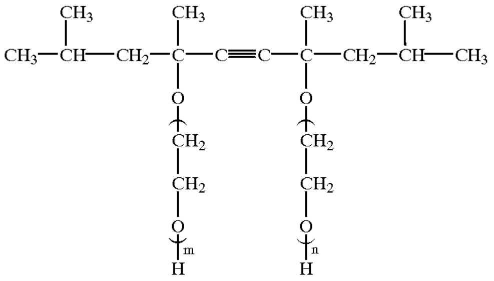

(m + n = 10)

EXAMPLE 4

Preparation of Clay Coating Composition

LUDOX SM-30 (240 g, 30% colloidal silica in water, Du Pont), METHOCEL K 100 LV binder resin (408 g, hydroxy propyl methyl cellulose 5% in water, Dow Chemical), TEX 540 kaolin clay (144 g, ECC International), SYLOID 7000 amorphous silica (32 g, W. R. Grace) and CT-121 non-ionic surfactant (12 g, Air Products) were mixed with 240 g water in a shear mixer for fifteen minutes and then passed through an Eiger horizontal mill filled with zirconia beads for a total of four passes to produce the clay coating composition summarized in Table 3 below:

TABLE 3

| COMPOUND | AMOUNT | AQUEOUS WT. % | SOLID WT. % |
|---|---|---|---|
| LUDOX SM-30 Colloidal Silica (30%) | 240 g | 6.7% | 26% |
| METHOCEL Hydroxypropyl methyl cellulose (5%) | 408 g | 1.9% | 7.5% |
| TEX 540 Kaolin Clay (avg. particle size 4–6 microns) | 144 g | 13.4% | 51% |
| Water | 240 g | 73% | — |
| SYLOID 7000 amorphous silica (avg. particle size 5 microns) | 32 g | 3.0% | 11.5% |
| CT-121 Non-ionic Surfactant | 12 g | 1.1% | 4% |

EXAMPLE 5

Application of the Clay Coating Composition

Tetramethyl orthosilicate (8 ml) was added to the clay coating composition of Example 4 (950 g). The coating composition was mixed vigorously and coated upon polyester or aluminum substrates using conventional coating methods to achieve a dry coating weight of 12–16 g/m$^2$. The coatings were allowed to harden/crosslink at 100–125° C. for 5–10 minutes.

TABLE 4

| Substrate | ● Polyester film from Kodak<br>● Degreased Aluminum |
|---|---|
| Drying Conditions | 100–120° C. for 5–10 minutes |
| Surface Roughness ($R_A$) | 0.6–0.8 micrometers |
| Dry Coating Weight | 12–16 g/m$^2$ |

EXAMPLE 6

The procedures of Examples 4 were repeated, with the exceptions that (i) the clay-containing coating composition contained a mixture of two different clays having two different particle sizes, and (ii) different mixing techniques were used. More particularly, LUDOX SM-30 (160 g), METHOCEL K 100 LV binder resin (408 g), kaolin clay G (80 g), TEX 540 kaolin clay (80 g), SYLOID 7000 amorphous silica (16 g) and CT-121 non-ionic surfactant (13 g) were mixed with 319 g water in a ceramic ball mill with ceramic shots (weight of shots was 1614 g) for 48 hours to produce the clay coating composition summarized in Table 5 below:

TABLE 5

| COMPOUND | AMOUNT | AQUEOUS WT. % | SOLID WT. % |
|---|---|---|---|
| LUDOX SM-30 Colloidal Silica (30%) | 160 g | 4.5% | 18.6% |
| METHOCEL K 100 LV Hydroxypropyl methyl cellulose (5%) | 408 g | 1.9% | 7.9% |
| Kaolin Clay G (avg. particle size 5.3 microns) | 80 g | 7.4% | 31% |
| TEX 540 Kaolin Clay (avg. particle size 4–6 microns) | 80 g | 7.4% | 31% |
| Water | 319 g | 76.1% | — |

TABLE 5-continued

| COMPOUND | AMOUNT | AQUEOUS WT. % | SOLID WT. % |
|---|---|---|---|
| SYLOID 7000 amorphous silica (avg. particle size 5 microns) | 16 g | 1.5% | 6.2% |
| CT-121 Non-ionic Surfactant | 13 g | 1.2% | 5% |

EXAMPLE 7

Application of the Clay Coating Composition

Tetramethyl orthosilicate (8 ml) was added to the clay coating composition of Example 6 (950 g). The coating composition was mixed vigorously and coated upon polyester and aluminum substrates using conventional coating methods to achieve a dry coating weight of 12–16 g/m$^2$. The coatings were allowed to harden/crosslink at 100–125° C. for 5–10 minutes.

TABLE 6

| Substrate | ● Polyester film from Kodak<br>● Degreased Aluminum |
|---|---|
| Drying Conditions | 100-120° C. 5–10 minutes |
| Surface Roughness ($R_A$) | 0.6–0.8 micrometers |
| Dry Coating Weight | 12–14 g/m$^2$ |

EXAMPLE 8

Manufacture of Printable Media

The three fluid compositions prepared in Example 3 were imagewise applied to the clay containing hydrophilic substrates of Examples 5 and 7 using a commercially available EPSON ink jet printer having an ink jet drop volume of approximately 14 picoliters. Table 5 below summarizes the resolution achieved by the clay containing hydrophilic substrates in comparison to three non-porous plates. The first non-porous substrate, "STD-1," is an aluminum oxide plate which is degreased, etched and subjected to a desmut step. The smooth plate is then anodized without any roughening step and coated with a silicated interlayer by immersing the plate in a sodium silicate solution (80 g/liter), commercially available under the trademark N-38 from the Philadelphia Quartz Co. at 75° C. for one minute. The coated plate is then rinsed with deionized water and dried at room temperature.

The second and third non-porous substrates, STD-2 and STD-3, respectively, are commercially available.

"Average ratio" is an average value based on over 30 dots, and was determined by optical microscopy and commercially available Image Pro software. The hydrophilic, porous layers of the printable media produced in Examples 5 and 7 exhibited substantially the same average ratio, regardless of whether they were adhered to polyester film substrates or aluminum substrates.

The porosities of the printable media substrates of Examples 5 and 7 and three non-porous substrates, STD-1 through STD-3, were evaluated by acoustic measurements using an EST surface sizing tester commercially available from Muetek Analytic, Inc. An acoustic emitter and receiver are placed on opposite sides of a container filled with water, and a continuous acoustic signal is transmitted from the emitter through the water to the receiver. The substrate to be tested is then placed in the container perpendicularly to the acoustic wave direction, and the decrease, if any, in the transmitted signal strength is measured over time. A decrease in signal strength indicates penetration of the water into the interior of the hydrophilic layer.

The three non-porous substrates, STD-1 through STD-3, exhibited less than 3% attenuation at sixty seconds after immersion. In contrast, the porous substrates of Examples 5 and 7 exhibited an attenuation of 81% and 89% at one second after immersion, respectively.

TABLE 7

IJ Test Results

| Substrate | Fluid Composition | Resolution (dpi) | Average Ratio | Comments |
|---|---|---|---|---|
| STD-1 | III-1 | 432 | 1.97 | Fingerprints |
| Ex. 5 | III-1 | 457 | 1.86 | |
| Ex. 7 | III-1 | 464 | 1.83 | |
| STD-3 | III-1 | 230 | 3.70 | |
| STD-2 | III-1 | — | — | Blurry Image |
| STD-1 | III-2 | 395 | 2.16 | Fingerprints |
| Ex. 5 | III-2 | 381 | 2.23 | |
| Ex. 7 | III-2 | 407 | 2.09 | |
| STD-2 | III-2 | — | — | Blurry Image |
| STD-3 | III-2 | 202 | 4.20 | |
| STD-1 | III-3 | 377 | 2.25 | Fingerprints |
| Ex. 5 | III-3 | 436 | 1.96 | |
| Ex. 7 | III-3 | 371 | 2.29 | |
| STD-2 | III-3 | — | — | Blurry Image |
| STD-3 | III-3 | 189 | 4.43 | |

EXAMPLE 9

Press Trial

The clay containing hydrophilic substrates of Examples 5 and 7, along with 2 conventional plates, were imaged with a fluid composition of Example 3. The resulting printable media were run on a lithographic press for 100,000 impressions. Table 8 summarizes their performance as lithographic printing plates.

TABLE 8

Press Trial Results

| Fluid Composition | Substrate | Resistance to Wear | Finger Print |
|---|---|---|---|
| 111-2 | Ex. 5 | OK | NO |
| 111-2 | Ex. 7 | OK | NO |
| 111-2 | CHB-Silicated | OK | YES |
| 111-2 | STD-1 | OK | Severe |

CHB-Silicated: “CHB” refers to chemical graining in a basic solution. After a matte finishing process, a solution of 50 to 100 g/liter NaOH is used during graining at 50 to 70° C. for 1 minute. The grained plate is then anodized using DC current of about 8 A/cm$^2$ for 30 seconds in an $H_2SO_4$ solution (280 g/liter) at 30° C. The anodized plate is then coated with an interlayer.

“Silicated” means the anodized plate is immersed in a sodium silicate solution (80 g/liter), commercially available under the trademark N-38 from the Philadelphia Quartz Co. at 75° C. for one minute. The coated plate is then rinsed with deionized water and dried at room temperature.

“Resistance to Wear” is the ability of a lithographic printing plate to withstand numerous impressions without loss of image and corresponding loss of density.

“Fingerprint” is measured by deliberately pressing one’s hands on the non-image areas of a lithographic printing plate immediately prior to printing, and then inspecting images printed using the printing plate to determine whether such images include a handprint.

EXAMPLE 10

Evaluation of Silicated Clay-Containing Layer

The clay-containing substrate produced in Example 5 was silicated by immersing it in a sodium silicate solution (80 g/liter), commercially available under the trademark N-38 from the Philadelphia Quartz Co., at 75° C. for one minute. The coated plate was then rinsed with deionized water and dried at room temperature.

Both the silicated porous layer, and a corresponding non-silicated porous control, were imaged with fluid composition III-1 of Example 3 using an ink jet printer. The average ratio of the silicated porous layer was 1.61, which compares favorably to the 1.86 average ratio value achieved by the non-silicated porous control.

We claim:

1. A printable media, comprising:

(a) a substrate having a hydrophilic, porous layer on at least one surface, said hydrophilic layer comprising a water soluble binder, a hardening agent and a clay; and (b) an ink receptive, thermoplastic image layer adhered to said hydrophilic porous layer, wherein said ink receptive layer contains a copolymer having a low surface energy and a plurality of tertiary amine sites, said amine sites being at least partially neutralized with an acid.

2. The printable media of claim 1, wherein said clay is selected from the group consisting of kaolin, hydrotalcite, glauconite, a mixture of metal oxides, a serpentine clay, a montmorillonite clay, an illite clay, a chlorite clay, a vermiculite clay, a bauxite clay, an attapulgite clay, a sepiolite clay, a palygorskite clay, a corrensite clay, an allophane clay, an imogolite clay, a boehmite clay, a gibsite clay, a cliachite clay and a laponite clay.

3. The printable media of claim 2, wherein said hydrophilic, porous layer further comprises colloidal silica having an average particle size of less than 1 micron, and amorphous silica having an average particle size of at least 1 micron.

4. The printable media of claim 2, wherein said water soluble binder is selected from the group consisting of gelatin, a cellulose, poly(vinyl pyrrolidone), polyacrylamide, polyvinyl alcohol, agar, algin, carrageenan, fucoidan, laminaran, gum arabic, corn hull gum, gum ghatti, guar gum, karaya gum, locust bean gum, pectin, dextran, starch and polypeptide.

5. The printable media of claim 4, wherein said water soluble binder comprises a cellulosic polymer and wherein said clay is a mixture of aluminum oxide and silicon oxide.

6. The printable media of claim 5, wherein said clay further comprises sodium, titanium, calcium, aluminum and silica.

7. The printable media of claim 1, wherein said substrate is selected from the group consisting of aluminum, polymeric film and paper.

8. The printable media of claim 1, further comprising an interlayer between said hydrophilic porous layer and said ink receptive, thermoplastic, image layer, said interlayer having a plurality of sodium silicate sites.

9. The printable media of claim 1, wherein said substrate is roughened aluminum.

10. The printable media of claim 1, wherein said ink receptive layer comprises a plurality of dots applied by ink jet printing.

11. The printable media of claim 10, wherein said dots have an average ratio of not more than 2.5.

12. The printable media of claim 11, wherein said average ratio is not more than 2.2.

13. The printable media of claim 1, wherein a dry coating weight of the hydrophilic, porous layer is at least 5 $g/m^2$.

14. The printable media of claim 13, wherein the dry coating weight of the hydrophilic, porous layer is from 10 to 20 $g/m^2$.

15. The printable media of claim 1, wherein said hydrophilic, porous layer has a surface roughness ($R_a$) of from about 0.5 to about 1.0 micrometer.

16. A method for preparing a printable media, comprising:

(a) applying a hydrophilic porous layer onto a substrate, said hydrophilic layer comprising a water soluble binder, a hardening agent and a clay;

(b) applying a fluid composition onto said hydrophilic porous layer by means of an ink jet printing apparatus, wherein said fluid composition contains a copolymer having a plurality of tertiary amine sites, said amine sites being at least partially neutralized with an acid, and (c) drying said fluid composition.

17. The method of claim 16, wherein said substrate is selected from the group consisting of aluminum, polymeric film and paper.

18. The method of claim 16, wherein a surface of said substrate has been roughened.

19. The method of claim 16, wherein said substrate is roughened aluminum.

20. The method of claim 16, wherein said clay is selected from the group consisting of kaolin, hydrotalcite, glauconite, a mixture of metal oxides, a serpentine clay, a montmorillonite clay, an illite clay, a chlorite clay, a vermiculite clay, a bauxite clay, an attapulgite clay, a sepiolite clay, a palygorskite clay, a corrensite clay, an allophane clay, an imogolite clay, a boehmite clay, a gibsite clay, a cliachite clay and a laponite clay.

21. The method of claim 20, wherein said binder comprises a cellulosic polymer and wherein said clay is a mixture of aluminum oxide and silicon oxide.

22. The method of claim 16, wherein said fluid composition also contains a surfactant, a humectant and water.

23. The method of claim 22, wherein said surfactant is selected from the group consisting of acetylenic glycols, ethoxylated glycols, ethoxylated/propoxylated block copolymers and sorbitan esters.

24. The method of claim 22, wherein said humectant is selected from the group consisting of glycerol, ethylene glycol, diethylene glycol, triethylene glycol, propylene glycol, dipropylene glycol, tripropylene glycol, ethylene glycol monomethyl ether, diethylene glycol monomethyl ether, triethylene glycol monomethyl ether, propylene glycol monomethyl ether, di-propylene glycol monomethyl ether and tripropylene glycol monomethyl ether.

25. The method of claim 24, wherein said humectant comprises glycerol.

26. The method of claim 22, wherein said fluid composition has a viscosity of 20 centipoise or less at 25° C.

27. The method of claim 26, wherein said viscosity is from 1 to 5 centipoise at 25° C.

28. The method of claim 22, wherein said copolymer is present in an amount of from 0.1 to 10 weight percent based upon the total weight of the composition.

29. The method of claim 22, wherein said surfactant is present in an amount of from 0.001 to 5 weight percent based upon the total weight of the composition.

30. The method of claim 22, wherein said humectant is present in an amount of from 1 to 10 weight percent, based on the total weight of the composition.

31. The method of claim 16, wherein said copolymer is selected from the group consisting of polyacrylates, styrenated polyacrylates, polyamides and polyurethanes.

32. The method of claim 31, wherein said copolymer is either a polyacrylate or a styrenated polyacrylate, and is prepared from a comonomer having the following formula:

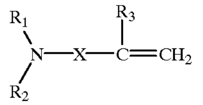

wherein $R_1$ is hydrogen or $C_{1-5}$ alkyl;

$R_2$ is $C_{1-5}$ alkyl;

$R_3$ is hydrogen or methyl;

X is $—C_6H_4—$ or

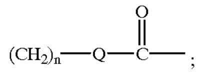

n is 2 to 6; and

Q is oxygen or N—H.

33. The method of claim 32, wherein said comonomer is an acrylate selected from the group consisting of dimethylaminoethyl acrylate, dimethylaminoethyl methacrylate, diethylaminoethyl acrylate, diethylaminoethyl methacrylate, di(t-butyl)aminoethyl acrylate and di(t-butyl)aminoethyl methacrylate.

34. The printable media of claim 32, wherein said monomer is dimethylaminopropyl methacrylamide.

35. The printable media of claim 32, wherein said monomer is a styrene selected from the group consisting of p-dimethylamino styrene and diethylamino styrene.

36. The method of claim 31, wherein said copolymer is a polyamide prepared from a comonomer having at least one tertiary amino site in its backbone.

37. The method of claim 36, wherein said comonomer is an alkyl-substituted piperazine or alkylester-substituted piperazine.

38. The method of claim 37, wherein said alkyl-substituted piperazine is selected from the group consisting of 1,4-bis(3-aminopropyl) piperazine and dialkyl 1,4-piperazinedipropionate.

39. The method of claim 31, wherein said copolymer is a polyurethane prepared from a comonomer having the following formula:

$HOH_2CH_2C—Z—CH_2CH_2OH$ wherein Z is an aliphatic, cycloaliphatic or aromatic divalent radical which contains at least one tertiary amino group, with the proviso that the radical is bonded to the remainder of the comonomer structure by carbon-to-carbon bonds.

40. The method of claim 39, wherein said comonomer conforms to the following formula:

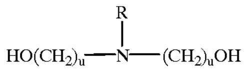

wherein

R is an aliphatic, cycloaliphatic or aromatic substituent, and u is 1 to 6.

41. The method of claim 39, wherein said comonomer conforms to the following formula:

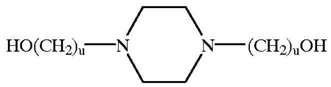

where u is 1 to 6.

42. The method of claim 39, wherein said comonomer is N-methyldiethanolamine.

43. The method of claim 16, wherein said acid is a compound which conforms to one of the formulae in the group consisting of $H—(CH_2)_n—COOH$ and

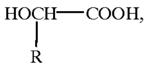

wherein

R is hydrogen, $—CH_3$ or $—CH_2CH_3$; and n is a number from 0 to 6.

44. The method of claim 16, wherein said acid is selected from the group consisting of formic acid, acetic acid, lactic acid, and glycolic acid.

45. The method of claim 16, wherein said copolymer has a maximum surface energy of 50 dynes/cm.

46. The method of claim 45, wherein the surface energy of said copolymer is from 20 to 50 dynes/cm.

47. A printable media prepared according to the method of claim 16.

* * * * *